R. A. WEAGANT.
WIRELESS SIGNALING APPARATUS.
APPLICATION FILED FEB. 1, 1916.
1,342,399.
Patented June 1, 1920.
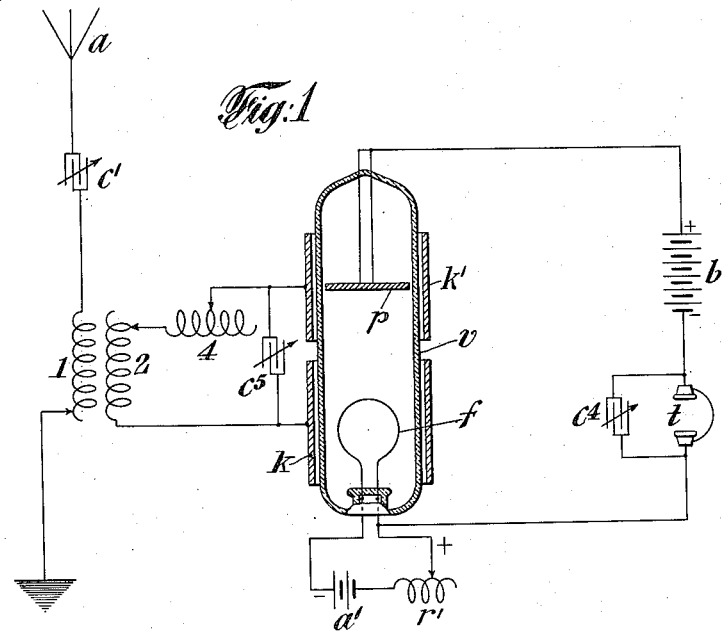
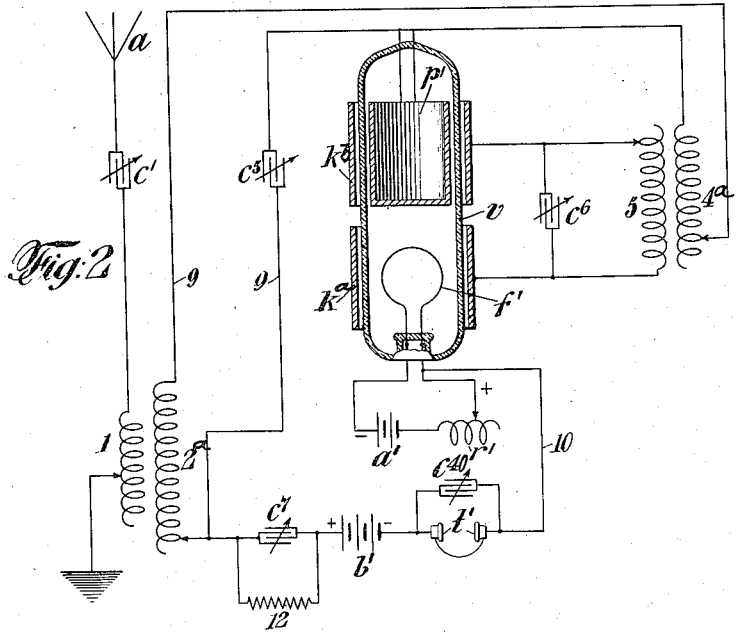
Inventor
Roy A. Weagant
By his Attorneys

UNITED STATES PATENT OFFICE.

ROY A. WEAGANT, OF ROSELLE, NEW JERSEY, ASSIGNOR, BY MESNE ASSIGNMENTS, TO RADIO CORPORATION OF AMERICA, A CORPORATION OF DELAWARE.

WIRELESS SIGNALING APPARATUS.

1,342,399.   Specification of Letters Patent.   Patented June 1, 1920.

Application filed February 1, 1916. Serial No. 75,562.

*To all whom it may concern:*

Be it known that I, ROY A. WEAGANT, a citizen of the United States, residing in the town of Roselle, county of Union, State of New Jersey, have made certain new and useful Improvements in Wireless Signaling Apparatus, of which the following is a specification.

This invention relates to an apparatus designed to provide an improved means for receiving, relaying or amplifying impulses or variations of electric current, such as are used in radio communication or wire telegraphy or telephony.

The invention is a modification of the well-known Fleming vacuum valve, shown and described in U. S. Letters Patent No. 803,684, dated November 7, 1905.

In my novel and improved form of this valve there is employed a vacuum chamber; within said chamber there is a hot element and a comparatively cold element, preferably in the form of a sheet metal bucket; and outside the vacuum chamber there are arranged two circuit terminals of extended area, in proximity to the hot and the cold elements, respectively. This arrangement of vacuum valve is useful as a receiver, detector or amplifier of current variations, and also as a generator of electrical oscillations when employed in connection with suitable exterior circuit connections, as, for instance, those shown and described herein, where the invention is shown used in wireless telegraphy using damped or undamped oscillations.

The accompanying drawings illustrate the invention. Figure 1 shows one form of valve and an arrangement of circuits adapted for use with the valve. Fig. 2 shows another form of valve and modified circuits; Fig. 3 being a detail of the cold element shown in Fig. 2, in the form of a cup or bucket.

The vacuum chamber $v$ contains a suitably supported filament $f$ heated by battery $a'$ in a circuit with variable resistance $r'$, and a cold element of sheet metal suitably supported, with a lead or electrical connection passing through the end of the glass vacuum chamber $v$. The cold element may take the form shown at $p$, Fig. 1, being a round disk of metal, or that shown at $p'$, Fig. 2, being a metallic cylinder closed at the bottom. Outside the chamber $v$ is a cylindrical metal section $k$, arranged in position around the lower section of chamber $v$, and, surrounding the upper portion of chamber $v$ is a similar sheet metal section $k'$, arranged to take the position shown. The sections $k$ and $k'$ are preferably separated a distance about as shown. The cold element $p'$ in its preferred form of cup or bucket, in perspective, is shown in Fig. 3. In both Figs. 1 and 2 there is shown an antenna $a$, with an adjustable condenser $c'$, in series; and adjustable inductance 1, with ground connection. This inductance 1 is the primary coil of an oscillation transformer, the secondary coil 2 being in a local circuit, the terminals of which are the cylinder sections $k$ and $k'$ respectively; this circuit includes the coil 2, an adjustable inductance 4 and an adjustable condenser $c^5$, in a conductor connecting opposite points of the circuit between the cylinders $k$, $k'$ and the coils 2 and 4. A second circuit has its terminals in the filament $f$ and the comparatively cold element $p$, and in said circuit, in series, an electromotive force of, say, 100 to 10,000 volts, head telephones $t$ and an adjustable condenser $c^4$, bridging said telephones.

In Fig. 2 the adjustable inductance $4^a$ is employed as a primary coil and associated with a secondary coil 5, the two coils $4^a$ and 5 forming an oscillation transformer, the secondary coil of which 5, bridged by adjustable condenser $c^6$, is in a circuit having its terminals in the two cylindrical sections $k^a$ and $k^b$, respectively. In Fig. 2 there is shown a connection 10 between filament $f'$ and the movable point of connection between coil $2^a$ and the circuit 9, including coil $4^a$. In a circuit including battery $b'$ and connection 10 there is also the telephone $t'$, the bridging condenser $c^{40}$, the resistance 12, and an adjustable condenser $c^7$, bridging coil 12. The elements $a$, $c'$, 1, $v$, $a'$ and $r'$ are the same as the corresponding parts in Fig. 1.

In operation, considering first the utility of this novel valve as a detector, oscillations or impulses of radio frequency impressed on the aerial $a$, are transferred through the coupling 1, 2, and vary the electrical condition of the exterior elements or terminals $k$, $k'$; and this variation of conditions influences the electron flow in the space in the vacuum chamber $v$, between elements $f$ and

*p*, so that variations in the current of battery *b* are made apparent by the indicator or telephone *t*.

Referring now more particularly to Fig. 2, the same valve generates oscillations of high frequency, which coöperate with received oscillations, that is, oscillations arriving through the aerial *a*, and thus produce the so-called "beat" effect. This is due to the fact that both the received oscillations and the variations in local battery current, which are impressed upon the externally located members *k*, *k'*, influence the electron flow between elements *f* and *p'*, and consequently the flow of current in the local telephone circuit, as already described. Of course, if the circuits are tuned with respect to each other, the degree of coupling does not enter into the generation of oscillations. By properly tuning the local circuits to a frequency slightly different as compared with received, continuous oscillations in the antenna, beats of a desired frequency may be established, due to coöperation of the received, continuous oscillations, and the locally generated oscillations due to the described valve action.

It is thus possible to use my improved valve in a number of ways, for instance, as a detector, an amplifier, a generator and a local receiver, and it will be apparent to those skilled in the art that many variations of structure or connections may be made. I therefore do not intend to confine myself to the particular structure or connections shown, nor to the use of my invention in any particular way.

What I claim is:

1. In a device of the kind described, the combination with a sealed vacuum chamber containing a hot element and a cold element of two separate electrodes located outside said chamber and forming circuit terminals arranged in coöperative relation with the interior of the chamber.

2. In a device of the kind described, a sealed vacuum chamber containing a hot element and a bucket shaped element of lower temperature combined with a pair of electrodes located outside of said chamber, said electrodes having extended area and being arranged in coöperative relation with the interior of the chamber.

3. In a device of the kind described, the combination with a sealed vacuum chamber, containing a plurality of separated elements, of two separate terminals located outside of said chamber adapted to form circuit terminals, and arranged to coöperate with respect to the interior of the chamber by electrostatic induction.

4. In a device of the kind described, the combination with a sealed chamber containing a plurality of elements, of a plurality of separated electrodes located outside said chamber and arranged in coöperative relation with respect to the interior of the chamber, and means for causing an electron flow between said elements within the chamber.

5. In a device of the kind described, a sealed chamber inclosing a pair of separated electrodes, means for causing an electron flow between the electrodes, and separate electrodes external to the chamber and forming the terminals of a circuit, the potential or current in which is varying, adapted to influence the electron flow in response to received signals.

6. In a device of the kind described, a sealed chamber inclosing a pair of separated electrodes, means for causing an electron flow between the electrodes, a plurality of electrodes located outside the chamber, and means for impressing variations of potential or current thereon to influence the electron flow.

7. In a device of the kind described, a sealed chamber inclosing a plurality of separated electrodes, and a plurality of metallic electrodes located outside the chamber and in close proximity to its walls.

8. In a device of the kind described, a vacuous vessel containing a plurality of electrodes, a plurality of electrodes outside the vessel and in proximity thereto, means for causing an electron flow between the first mentioned electrodes, means for impressing the received oscillations upon the externally located electrodes, a local source of energy, and means for impressing the energy from the local source upon the externally located electrodes.

9. In a device of the kind described, a sealed chamber containing a pair of separated electrodes, a plurality of electrodes located externally to the chamber and in proximity thereto, a circuit connecting the externally located electrodes, means for causing an electron flow between the first mentioned electrodes, a circuit containing a local source of energy, means for causing variations in the current of said local energy circuit in response to received oscillations, and means for impressing said current variations upon the circuit containing the externally located electrodes.

10. In a device of the kind described, a sealed chamber containing a plurality of electrodes, means for maintaining an electron flow between said electrodes, a plurality of conducting members located externally to said vessel and in proximity thereto and arranged to affect said electron flow by electrostatic induction, a receiving circuit coupled to the externally located elements, a circuit connected to the electrodes and containing a local source of energy, said circuits being operatively connected so that energy from said local source is impressed upon the receiving circuit to maintain continuous oscillations.

11. In a device of the kind described, a sealed vacuum chamber containing a hot electrode and a cold electrode and conducting elements substantially surrounding each of said electrodes and located outside of said chamber, and a circuit connecting said conducting elements.

12. In a device of the kind described, a sealed vacuum chamber containing a hot electrode and a cold electrode, a conducting element of extended surface area adjacent each of said electrodes and located outside of said chamber, and a circuit responsive to received oscillations connecting said conducting elements.

13. In apparatus of the class described in combination, a sealed chamber containing a plurality of electrodes, means for maintaining an electron flow between said electrodes, a plurality of spaced conducting members external to said chamber and cut off from conductive connection with the interior thereof, said members being arranged to affect said electron flow by electrostatic induction, a circuit whose opposite ends are connected to said members, and a condenser connected between said members.

14. In apparatus of the class described in combination, a sealed chamber containing a hot electrode, a cold electrode, an external circuit connecting said electrodes containing a coupling inductance and a condenser connected between said inductance and said cold electrode, two spaced conducting members external to said chamber and arranged to affect the interior of the chamber by electrostatic induction, and a circuit coupled to said circuit and having its ends connected to said members.

15. In an apparatus of the class described in combination, a sealed chamber containing a hot electrode, a cold electrode, an external circuit connecting said electrodes containing a coupling inductance, said circuit containing means whereby it may be adjusted to cause said chamber to generate local oscillations, a condenser connected between said inductance and said cold electrode, two spaced conducting members external to said chamber and arranged to affect the interior of the chamber by electrostatic induction, and a circuit coupled to said circuit and having its ends connected to said members.

In testimony whereof I have signed this specification in the presence of two subscribing witnesses.

ROY A. WEAGANT.

Witnesses:
M. M. RIEMANN,
JOHN HERR, Jr.